H. H. LOOMIS.
PRUNING DEVICE FOR BANANA CULTURE.
APPLICATION FILED FEB. 12, 1916.

1,194,044.

Patented Aug. 8, 1916.

WITNESS:
R. E. Hamilton

INVENTOR
H. H. Loomis.
BY
Chas. W. Gerard,
his ATTORNEY.

UNITED STATES PATENT OFFICE.

HOWARD H. LOOMIS, OF QUIRIGUA, GUATEMALA.

PRUNING DEVICE FOR BANANA CULTURE.

1,194,044.        Specification of Letters Patent.        Patented Aug. 8, 1916.

Application filed February 12, 1916. Serial No. 78,015.

*To all whom it may concern:*

Be it known that I, HOWARD H. LOOMIS, a citizen of the United States, residing at Quirigua, Guatemala, have invented certain new and useful Improvements in Pruning Devices for Banana Culture, of which the following is a full and exact specification.

This invention relates to tools for use in banana culture, and particularly to cutting or pruning devices designed for thinning out the plants and cutting away undesirable growths.

The general object in view is to provide a tool adapted to operate in an improved manner for pruning out unproductive plants, and for thinning out the same without danger of injury to those desired to be preserved. Accordingly an improved pruning blade construction has been devised for this purpose, having a peculiar arrangement of cutting edges as hereinafter described, and the formation is such as also to provide means for convenient removal of the refuse from the plants.

With this general object in view, the invention will now be described with reference to one form of construction which has been found to afford an efficient and practical embodiment of the present improvements, after which those features deemed to be novel will be severally set forth in the appended claims.

The form of construction to be described is illustrated in the accompanying drawing, forming a part of this specification, and in which—

Figure 1:
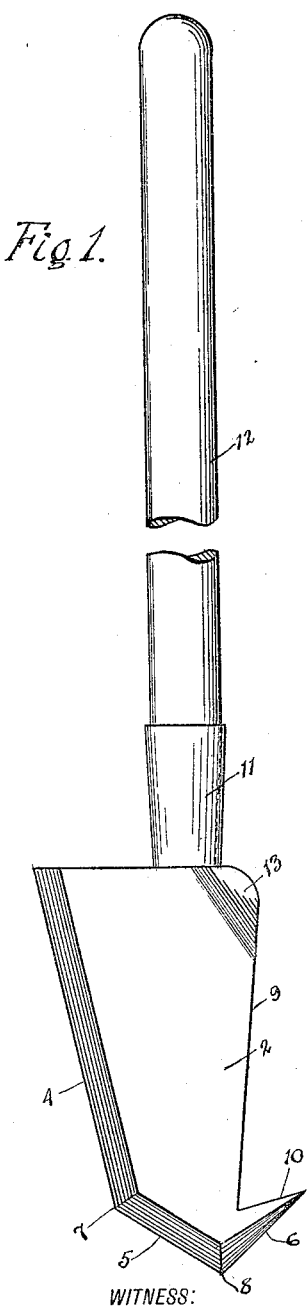
Figure 2:
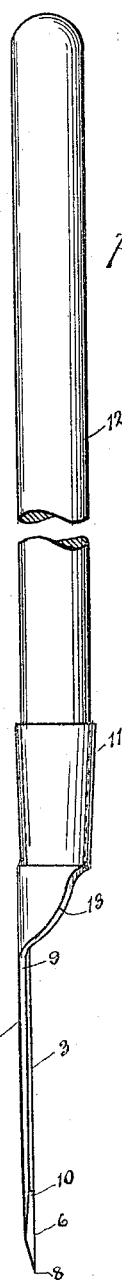
Figure 3:
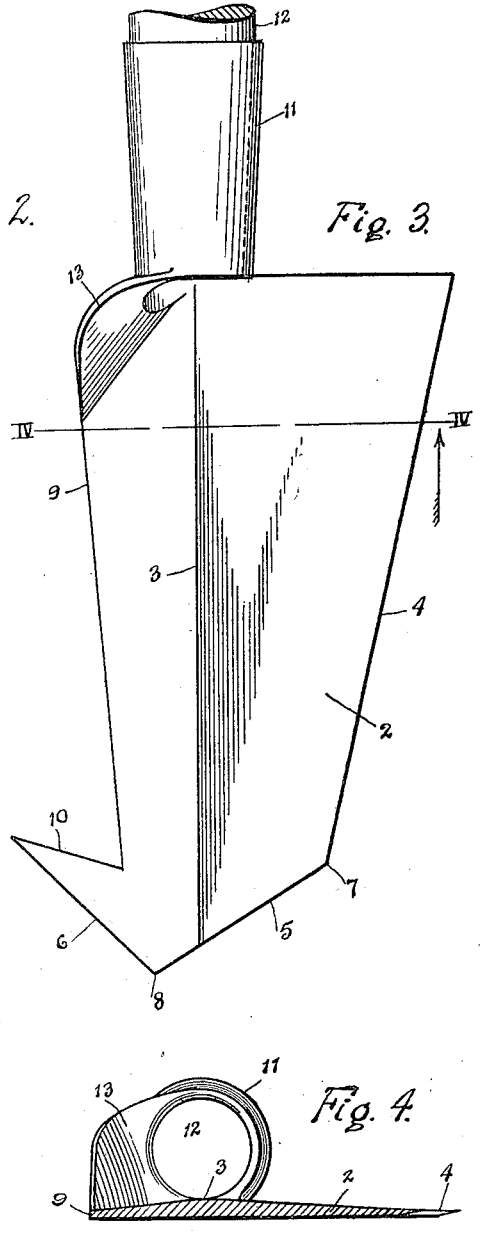
Figure 4:
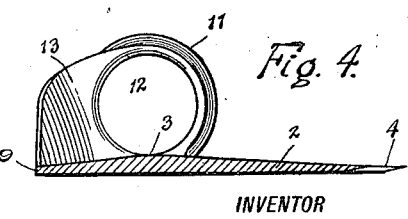

Figure 1 is a plan view of the device with the handle portion thereof partly broken away; Fig. 2 is a similar view of the same looking edgewise at the blade portion of the device; Fig. 3 is an enlarged plan view of the blade portion of the device, showing the face opposite to that illustrated in Fig. 1; and Fig. 4 is a transverse section taken on the line IV—IV of Fig. 3.

In banana culture it is the practice, after the plants or shoots have once borne and their fruit has been harvested, to cut away these plants or shoots as having no further bearing capacity. It is also necessary to keep the banana "mat" free from the growth of "water suckers" or unproductive stalks, and to remove these from the mat. Again it frequently happens that several shoots or "swords" will be found following the same parent shoot, so that it becomes desirable to remove one or more of them for the sake of the remaining ones. Now the space within which these various operations must be carried on is in most cases very restricted, so that great care must be exercised if injury is not to be inflicted upon the plants that are to be preserved. With the usual form of machete, with which this work has heretofore been done, it is extremely difficult to avoid injury to adjacent plants, for this instrument must necessarily be wielded with a cross or swinging stroke and requires a greater degree of care than can be expected on the part of the average workman to carry out the operation without some damage to a large percentage of the plants.

Referring to the drawing in detail, the device is shown as comprising a blade portion 2 of substantially flat form, but slightly thickened through its intermediate portion so that one face of the blade slopes gradually toward an intermediate line 3 (see Figs. 3 and 4), representing what may be regarded as approximately the axial line of the implement. This blade is formed with a plurality of cutting edges, viz., a side cutting edge 4 running at an angle to the axial line 3, and two shorter cutting edges 5 and 6, extending across the front end of the blade at an angle to each other, with the cutting edges 4 and 5 meeting at the point 7. The cutting edges 5 and 6 extend forwardly and angularly with reference to the axial line 3 and meet at the point 8, which is laterally displaced from said line 3, the latter intersecting the cutting edge 5 (see Fig. 3). The blade thus is formed with three edges sharpened for cutting and meeting at obtuse angles to each other, but converging forwardly with reference to the axial line 3. These cutting edges, moreover, are formed by beveling the edges from one face of the blade to the opposite face, *i. e.*, by means of a single bevel, as it is found that this form of cutting edge affords greater penetrating power for the purpose for which the implement is designed.

The side 9 of the blade 2, opposite to the cutting edge 4, is partly cut away so that a hook member 10 is formed adjacent to the forward end of the blade by the same portion thereof as carries the cutting edge 6, said hook portion pointing in a rearward direction.

The rear end of the blade is provided with a handle socket 11 adapted to be fitted with the handle 12, the axis of which is approximately in line with the longitudinal line 3 of the blade, the two being displaced merely a distance equal to the radius of the handle member. The socket 11 is connected with the side 9 of the blade by an angularly bent portion 13 forming a curved wing and acting to strengthen the mounting of said handle socket.

There is thus obtained a cutting and pruning implement, the cutting operation of which is effected principally by means of a forward stroke in a direction which is substantially in the axial line of the tool, as opposed to a cutting stroke made by a crosswise movement or swinging of the tool as above referred to in connection with the machete form of implement. This is especially important where it is desired to remove a superfluous sucker from a restricted space between two bearing shoots. If the tool be given a transverse or swinging stroke, its point is almost certain to nick or scar some of the adjacent profitable shoots or "swords;" and, while the damage due to the injury may not be at once apparent, it will in any case impair the bearing capacity of the injured shoots; that is, if their productive value is not destroyed altogether, they will no longer yield fruit of the first grade, but produce only what is known as "seconds." With the present improved implement, however, the cutting is done with a forward axial stroke, so that there is no sweep of the blade through any appreciable distance, but merely a forward thrust, and it becomes necessary for the workman to notice particularly the position of the plant or sucker which he intends to remove, a precaution not always observed in the use of a machete since the workman knows that it will cut everything in its path. But the necessity of extending the "mat" more closely and noting the relative position of the plants in order to make effective use of the pruning implement is a point gained; for, without the exercise of at least as much care as will naturally be involved in such preliminary examination of the "mat" to note the proper plants and stalks for pruning, no really intelligent pruning operation can take place.

The particular arrangement of cutting edges 4, 5 and 6 is that which has been found by actual practice to be best adapted for effective cutting action under the circumstances of the implement's use, i. e., the cutting by a forward thrust and in a restricted space, and in material which has approximately the consistency of vegetable roots. After passing the edge 5, the cutting is accomplished by the inclined edge 4, in the use of which there is of course a measure of transverse as well as forward thrust imparted to the blade.

Heretofore, in pruning with a machete it has been customary to employ a hooked stick for pulling out the pruned material or refuse in clearing the "mat." For carrying out the same function, the blade of the present implement has been merely recessed along one side, as illustrated, to form the rearwardly pointed hook 10 whereby the rearward stroke of the tool may be utilized in withdrawing the refuse in place of using a separate tool for that purpose.

While the foregoing represents what is now deemed to constitute the preferred form of embodiment of the improvements, the right is reserved to such formal changes or modifications as may fairly fall within the scope of the appended claims.

Claims:

1. A pruning device for banana culture comprising a blade provided with a handle and having a plurality of angularly arranged cutting edges, one of said cutting edges being formed as a continuous straight line edge intersected by the axial line of the blade and the remaining cutting edges being inclined forwardly in a direction toward said axial line.

2. A pruning device for banana culture comprising a blade provided with a handle and with three straight cutting edges all converging forwardly and meeting at angles to each other, the intermediate cutting edge being intersected by the axial line of the blade.

3. A pruning device for banana culture comprising a blade provided with a handle and having three straight edges sharpened for cutting and meeting at obtuse angles to each other, the intermediate cutting edge being intersected by the axial line of the blade.

4. A pruning device for banana culture comprising a blade provided with a handle and with a pair of cutting edges converging forwardly and meeting at a point displaced laterally with reference to the axial line of the blade, said blade being provided with a dull-edged recess at the rear of one of said cutting edges to form a rearwardly pointing hook portion.

5. A pruning device for banana culture comprising a blade provided with a handle and having three edges sharpened for cutting and meeting at obtuse angles to each other, the intermediate cutting edge being intersected by the axial line of the blade and said blade being recessed at the rear of one of the remaining cutting edges to form a rearwardly pointing hook portion.

6. A pruning device for banana culture comprising a blade provided with a handle and having a plurality of angularly arranged cutting edges, one of said cutting edges being intersected by the axial line of the blade and the remaining cutting edges being inclined forwardly with reference to said axial line, said blade being recessed at the rear of one of said inclined edges to form a rearwardly hooked portion.

7. An implement for banana culture comprising a blade provided with a handle and having three edges sharpened for cutting and meeting at obtuse angles to each other and with one of said angles in advance of the other, said blade being provided with a dull-edged recess at the rear of one of said cutting edges to form a rearwardly pointing hook portion.

HOWARD H. LOOMIS.